US008140329B2

(12) United States Patent
Zhang et al.

(10) Patent No.: US 8,140,329 B2
(45) Date of Patent: Mar. 20, 2012

(54) METHOD AND APPARATUS FOR AUTOMATICALLY RECOGNIZING AUDIO DATA

(75) Inventors: Jian Zhang, Singapore (SG); Wei Lu, Singapore (SG); Xiaobing Sun, Singapore (SG)

(73) Assignee: Sony Corporation, Tokyo (JP)

( * ) Notice: Subject to any disclaimer, the term of this patent is extended or adjusted under 35 U.S.C. 154(b) by 1085 days.

(21) Appl. No.: 10/818,625

(22) Filed: Apr. 5, 2004

(65) Prior Publication Data

US 2005/0027514 A1 Feb. 3, 2005

(30) Foreign Application Priority Data

Jul. 28, 2003 (SG) ............................... 200304014-4

(51) Int. Cl.
*G10L 15/02* (2006.01)
*G10L 15/00* (2006.01)

(52) U.S. Cl. ..................... 704/237; 704/256.1; 704/236; 704/231

(58) Field of Classification Search .................. 704/205, 704/256.1, 237, 236, 231
See application file for complete search history.

(56) References Cited

U.S. PATENT DOCUMENTS

| | | | | |
|---|---|---|---|---|
| 5,864,803 | A | 1/1999 | Nussbaum | |
| 5,918,223 | A | 6/1999 | Blum et al. | |
| 5,953,700 | A | 9/1999 | Kanevsky et al. | |
| 6,542,866 | B1 * | 4/2003 | Jiang et al. | 704/255 |
| 7,050,977 | B1 * | 5/2006 | Bennett | 704/270.1 |
| 2001/0044719 | A1 * | 11/2001 | Casey | 704/245 |
| 2003/0046071 | A1 * | 3/2003 | Wyman | 704/235 |
| 2004/0167767 | A1 * | 8/2004 | Xiong et al. | 704/1 |

FOREIGN PATENT DOCUMENTS

| | | |
|---|---|---|
| EP | 0 387 791 | 9/1990 |
| EP | 0 575 815 | 12/1993 |
| EP | 0 935 378 | 8/1999 |

OTHER PUBLICATIONS

Eronen, Antti. "Musical instrument recognition using ICA-based transform of features and discriminatively trained HMMs". IEEE Seventh International Symposium on Signal Processing and Its Applications, vol. 2, p. 133-136. Jul. 1-4, 2003.*
Rosca et al. "Cepstrum-like ICA Representations for Text Independent Speaker Recognition". 4th International Symposium on Independent Component Analysis and Blind Signal Separation, Apr. 2003, p. 999-1004.*
Park et al. On Subband-Based Blind Separation for Noisy Speech Recognition. Electron. Lett. 35 (1999) 2011-2012.*

(Continued)

*Primary Examiner* — Talivaldis Ivars Smits
*Assistant Examiner* — Jesse Pullias
(74) *Attorney, Agent, or Firm* — Frommer Lawrence & Haug LLP; William S. Frommer; Ellen Marcie Emas

(57) ABSTRACT

A method and apparatus are proposed for automatically recognizing observed audio data. An observation vector is created of audio features extracted from the observed audio data and the observed audio data is recognized from the observation vector. The audio features include features are selected from a group of 3 types of features obtained from the observed audio data: (i) ICA features obtained by processing the observed audio data, (ii) first MFCC features obtained by removing a logarithm step from the conventional MFCC process, or (iii) second MFCC features obtained by applying the ICA process to results of a mel scale filter bank.

18 Claims, 4 Drawing Sheets

OTHER PUBLICATIONS

Potamitis et al. Spectral and Cepstral Projection Bases Constructed by Independent Component Analysis. Proceedings of the ICSLP, 2000, vol. 3, pp. 63-66.*

Alexandre et al. Root Homomorphic Deconvolution Schemes for Speech Processing in Car Noise Environments. pp. 99-102. 1993 IEEE International Conference on Acoustics, Speech, and Signal Processing, Mineapolis, Minnesota, USA.*

Tan et al. "Modified Mel-Frequency Cepstrum Coefficient". Proceedings of the Information Engineering Postgraduate Workshop 2003, pp. 127-130, Songkhla, Thailand, 2003.*

Eddie Wong and Sridha Sridharan, "Comparison of Linear Prediction Cepstrum Coefficients and Mel-Frequency Cepstrum Coefficients for Language Identification".

Aapo Hyvbarinen, Juha Karhunen and Erkki Oja, "Indpendent Component Analysis", ISBN 0-471-40540-X, Copyright 2001, John Wiley & Sons.

A. J. Bell and T.J. Sejnowski, "The 'Independent Components' of Natural Scenes are Edge Filters", Vision Research, 37(23):3327-3338, 1997.

J.H. Lee, H.Y. Jung, T. W. Lee and S.Y. Lee, "Speech Feature Extraction Using Independent Component Analysis", 3rd International Conference of Independent Component Analysis, 2000 IEEE International Conference on Acoustics, Speech and Signal Processing, 2000, pp. 1631-1634.

Lawrence R. Rabiner, "A tutorial on Hidden Markov Models and Selected Applications in Speech Recognition", Proceedings of the IEEE, vol. 77, No. 2, pp. 257-286, Feb. 1989.

* cited by examiner

METHOD AND APPARATUS FOR AUTOMATICALLY RECOGNIZING AUDIO DATA

FIELD OF THE INVENTION

The present invention relates to a method and apparatus for automatically recognizing audio data, especially audio data obtained from an audio file played by a general audio device and subsequently recorded by a microphone, or an existing digital audio segment.

BACKGROUND OF THE INVENTION

Nowadays, with the development of the Internet and digital computing devices, digital audio data such as digital music is widely used. Thousands of audio files have been recorded and transmitted through the digital world. This means that a user who wishes to search for a particular one of a large number of audio files will have great difficulty doing so simply by listening. There exists a great demand to develop an automatic audio recognition system that can automatically recognize audio data. An automatic audio recognition (AAR) system should be able to recognize an audio file by recording a short period of the audio file in a noisy environment. A typical application of this AAR system could be an automatic music identification system. By this AAR system, a recorded music segment or an existing digital music segment can be recognized for further application.

There already exist some systems in the prior art that can analyze and recognize audio data based on the audio features of the data. An example of such a system is disclosed by U.S. Pat. No. 5,918,223, entitled "Method and article of manufacture for content-based analysis, storage, retrieval and segmentation of audio information", Thomas L. Blum et al. This system mainly depends on extracting many audio features of the audio data, such as amplitude, peak, pitch, brightness, bandwidth, MFCC (mel frequency cepstrum coefficients). These audio features are extracted from the audio data frame by frame. Then, a decision tree is used to classify and recognize the audio data.

One problem with such a system is that it requires the extraction of many features such as amplitude, peak, pitch, brightness, bandwidth, MFCC and their first derivatives from the selected audio data, and this is a complex, time-consuming calculation. For example, the main purpose of the MFCC is to mimic the function of the human ears. The process of deriving MFCC can be divided into 6 steps shown in FIG. 4(*a*), which are: 1) Pre-emphasis, in which the audio signal is processed to improve its signal-to-noise ratio. 2) Windowing, in which the continuous audio data is blocked into frames of 25-ms with parts of the frames of 10-ms overlapping with each other, and after dividing the data into frames, each individual frame is processed using a hamming window so as to minimize the signal discontinuities at the edge of each frame, 3) a FFT (Fast Fourier Transform) is used to convert each frame of the audio data from the time domain into the frequency domain. 4) A "Mel Scale Filter Bank" step in which a Mel scale is used to convert the spectrum of the signal to a Mel-warped spectrum. This is done without significant loss of data by passing the Fourier transformed signal through a set of band-pass filters. The filter bank has a triangular band pass frequency response, which is non-uniform in the frequency domain but uniformly distributed in the Mel-warped spectrum, 5) The logarithms of each of the Mel spectrum coefficients are then taken to reduce the coefficients whose frequencies are above 1000 Hz and magnify those with low frequencies. 6) Finally, the logarithmic Mel spectrum coefficients are converted back to the time domain by using a discrete cosine transform (DCT) to provide Mel frequency cepstrum coefficients (MFCC).

One problem associated with such a system is the effect on it of noise in the audio data. The extracted audio features in the system are very sensitive to the noise. Especially, MFCC features are very sensitive to white Gaussian noise, which is a wide band signal, which has equal energy in all frequencies. Since the Mel scale filters have wide passband at high frequency, the MFCC results at the high frequency have a low SNR. This effect will be amplified by step 5, the logarithm operation. Then, after the step 6 (i.e. the DCT operation), the MFCC features will be influenced over the whole of the time domain. White Gaussian noise always exists in the circuits of the AAR system. Also, when microphones record audio data, white Gaussian noise is added to the audio data. Furthermore, in a real situation, there is also a lot of environmental noise.

All of these noises make it hard for the AAR system to deal with the recorded data.

A further problem with the known system is that it requires a large part of the audio data file to achieve high recognition accuracy. However, in real situations, it takes a long time to record such a large part of the audio file and extract the required features from it, which makes it difficult to achieve real time recognition.

The concept of audio recognition is frequently used in the areas of speech recognition and speaker identification. Speech recognition and speaker identification are implemented by comparing speech sounds, so research on the above technology is focused on the extraction of speech sound features. A more general approach that can compare all sorts of sounds is required since the audio recognition task is quite different when the audio data is not speech. Audio features used in a speech recognition system are normally MFCC or linear predictive coding (LPC). Also, when a speech recognition system is trained using audio training data, the training data is collected using a microphone, and therefore already contains the white Gaussian noise. Thus, adaptive learning of the training data overcomes effect of the white Gaussian noise. However, in the context of an AAR system for recognizing music files, the training data is digital data having a much lower level of white Gaussian noise than the audio data which is to be recognized, so the effect of the white Gaussian noise cannot be ignored.

SUMMARY OF THE INVENTION

The object of the present invention is to provide a method and apparatus for automatically recognizing audio data, which can achieve high recognition accuracy and which is robust to noise including white Gaussian noise and environmental noise.

In general terms, a first aspect of the invention proposes that, in a system in which an observation vector is created of audio features extracted from observed audio data and the observation vector used to recognize from which of a number of target audio files the observed audio data was derived, the audio features should include one or more of the following features obtained from the observed audio data: (i) ICA features obtained by processing the observed audio data by an ICA process, (ii) first MFCC features obtained by removing a logarithm step from the conventional MFCC process, or (iii) second MFCC features obtained by applying the ICA process to results of a mel scale filter bank.

A second aspect of the invention proposes in general terms that, in a system in which an observation vector is created of audio features extracted from the observed audio data and the observation vector is used to recognize from which of a number of target audio files the observed audio data was derived, the recognition should be performed by using a respective HMM (hidden Markov model) for each of the target audio files.

BRIEF DESCRIPTION OF THE DRAWINGS

The present invention is better understood by reading the following detailed description of the preferred embodiment with reference to the accompanying figures, in which like reference numerals refer to like elements throughout, and in which.

DETAILED DESCRIPTION OF THE PREFERRED EMBODIMENTS OF THE INVENTION

Figure 1:
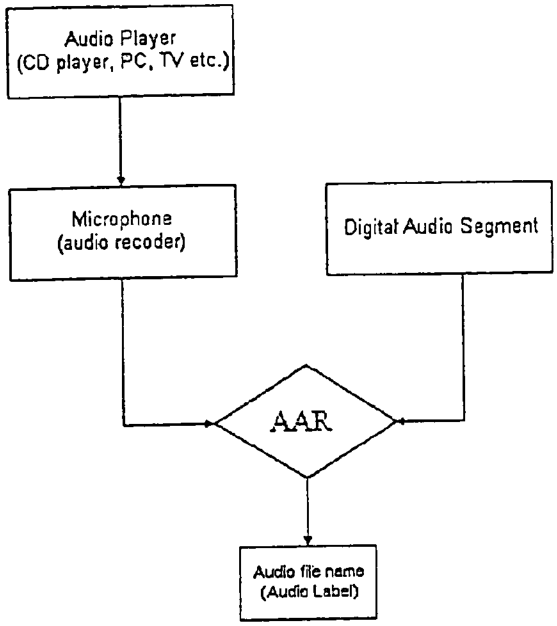
FIG. 1 is a flow chart showing a typical procedure of an AAR system which is an embodiment of the invention.

FIG. 1 is a flow chart showing schematically the procedure of an AAR system which is an embodiment of the invention. In the flow shown in the left-hand part of FIG. 1, an audio file played in a general audio device such as a TV, CD player, or Cassette Recorder can be recorded by a microphone, and then be recognized by the AAR system. In the flow shown in the right-hand part of FIG. 1, an existing audio segment in digital format can also be recognized by the AAR system. The recognition result is an audio label of the audio file or audio segment. The audio label can be generated in a format suitable for use in further applications.

Figure 2:
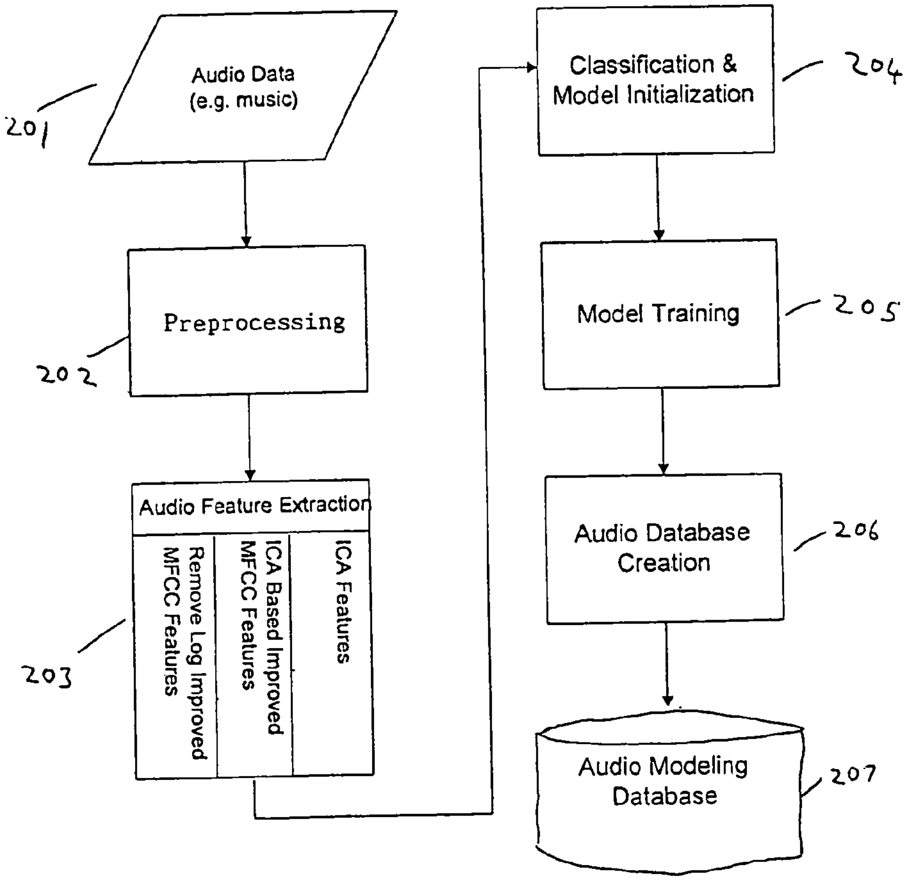
FIG. 2 is a flow chart showing an audio data modeling process performed in a system which is an embodiment of to the present invention.
Figure 3:
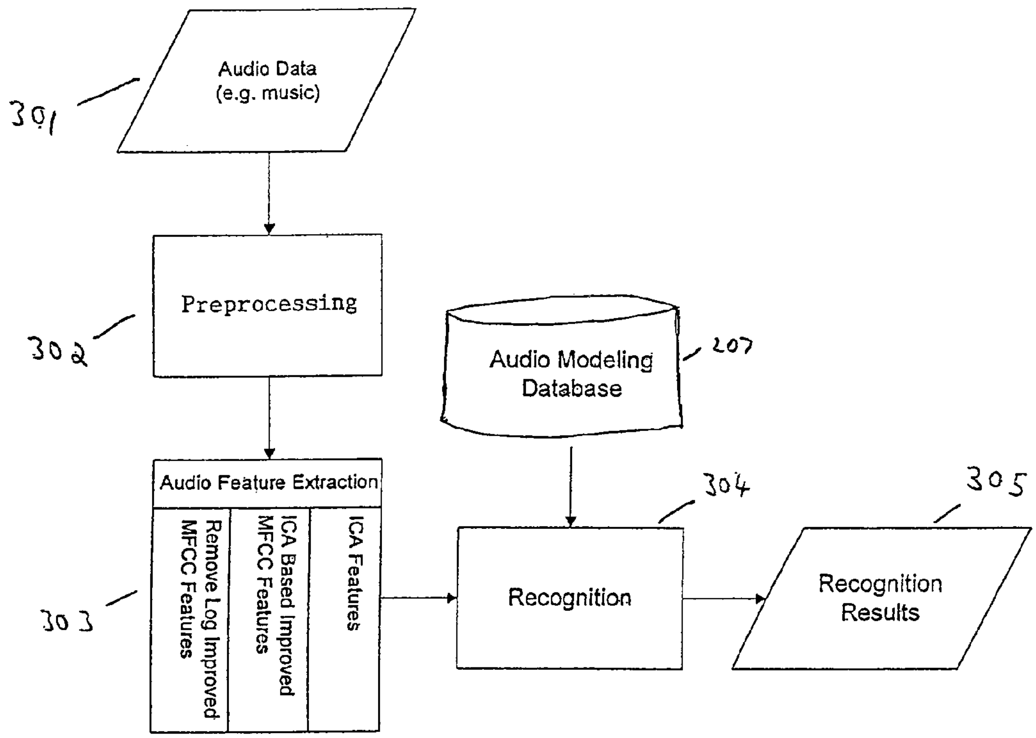
FIG. 3 is a flow chart showing an audio data recognition process performed in the system which is an embodiment of the present invention.

An embodiment of the invention which performs audio data recognition is illustrated in detail in FIG. 3, and the process of generating the embodiment ("audio data modeling") is shown in FIG. 2. The embodiment uses a new scheme for automatic audio recognition, including a new process for feature extraction and a new process for recognition of audio files from extracted features. The number of audio files which are to be recognized (the "target audio files") is denoted by W.

For the feature extraction, improved mel frequency cepstrum coefficients (IMFCC) features and independent component analysis (ICA) features are introduced to the system. As described above, conventional MFCC features are very sensitive to white Gaussian noise. By improving the MFCC features, the AAR system can be made robust to white Gaussian noise. In the embodiment, the MFCC features are improved in two alternative ways: removing the logarithm operation from the conventional MFCC algorithm, and replacing the logarithm operation and the Discrete Cosine Transform (DCT) of the MFCC algorithm with an ICA process. Details of these two ways will be introduced in the later section. The other kind of the audio features are called ICA features. By using the independent component analysis (ICA) methods to directly extract audio features from the audio data, the system performance can be dramatically improved.

Figure 4:
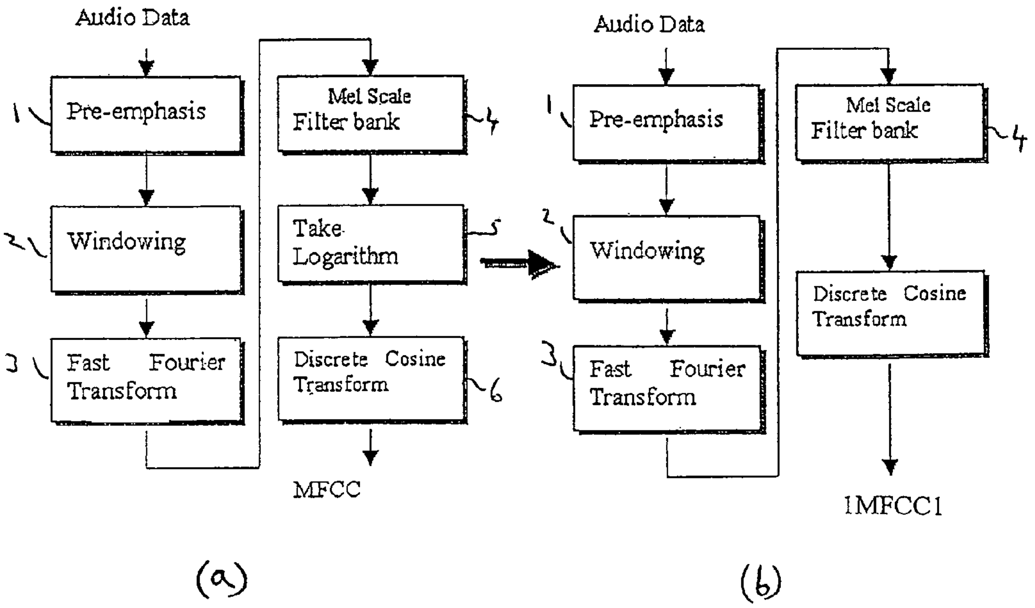
PRIOR ART Fig 4
FIG. 4, which is composed of FIG. 4(*a*) and FIG. 4(*b*), is flow charts respectively showing a conventional MFCC algorithm and a first improved MFCC algorithm used in the system of FIGS. 2 and 3.
Figure 5:
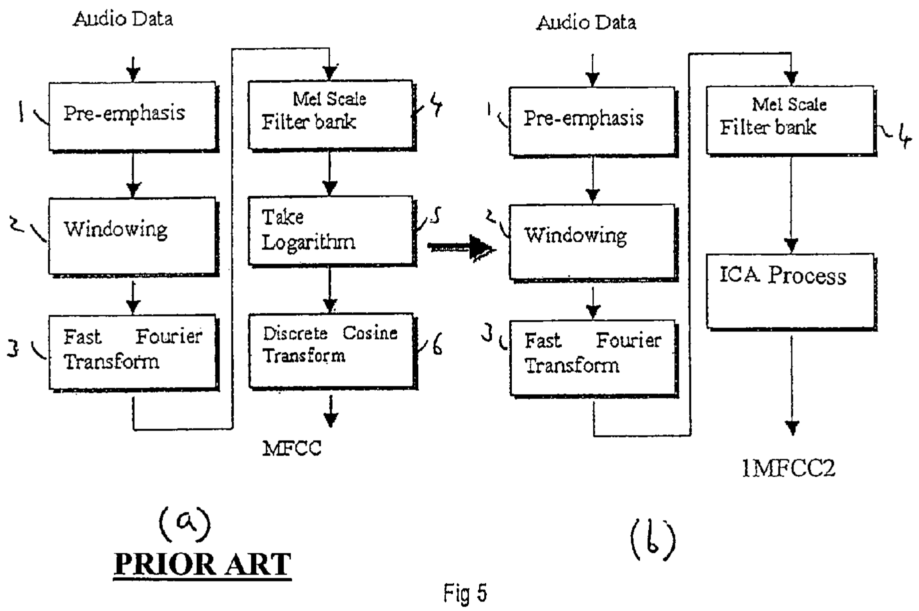
FIG. 5, which is composed of FIG. 5(*a*) and 5(*b*), is flow charts respectively showing the conventional MFCC algorithm (as in FIG. 4(*a* and a second improved MFCC algorithm used in the system of FIGS. 2 and 3.
Figure 6:
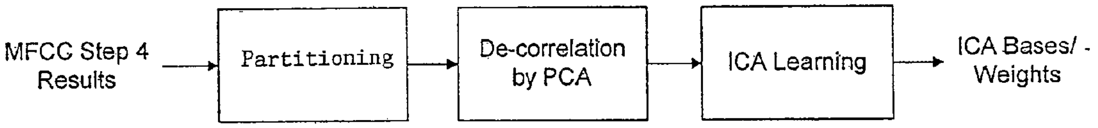
FIG. 6 is a flow chart showing a process used in the system of FIGS. 2 and 3 of computing Independent Coefficient Analysis (ICA) basis function/weight functions from MFCC results.

Two ways of improving the MFCC features are shown in FIGS. 4 to 6. As mentioned above, the MFCC features obtained by the conventional MFCC algorithm are very sensitive to white Gaussian noise. The MFCC feature can be improved by reducing the negative effect of the white Gaussian noise on the MFCC features, hence making the AAR system robust to the noises. Since the embodiment is for recognizing audio data generated by a machine, strict similarity to human perception is not necessary. The logarithm operation in the step 5 of the conventional MFCC algorithm as shown in the FIG. 4(*a*) is to mimic the human ear effect, and therefore is not strictly required for machine recognition. Furthermore, the logarithm operation amplifies low level signals which tend to be noise. In view of this, the first way of improving the MFCC feature is to remove the step 5 from the conventional MFCC algorithm, as shown in FIG. 4(*b*). The resulting improved MFCC feature, which is referred to as IMFCC 1, is more robust to both real environmental noise and the white Gaussian noise.

The second way of improving the MFCC features is motivated by the technique known as ICA analysis, which aims to extract from audio data a set of features which are as independent as possible in a higher-order statistical sense. ICA has been widely used to extract features in image and audio processing, e.g. to extract speech features for speech recognition application as disclosed in "Speech Feature Extraction Using Independent Component Analysis" by J.-H. Lee et al, at 3$^{rd}$ International Conference of Independent Component Analysis, 2001, San Diego, Calif., USA. This analysis generates more distinguishable audio features than those produced by the DCT operation which is only based on 2$^{nd}$-order statistics. The second way of improving the MFCC feature is to replace the logarithm and DCT operations in the conventional MFCC algorithm with an ICA process, as shown in FIG. 5(*b*), which results in ICA-based MFCC features referred to as IMFCC2.

Figure 7:
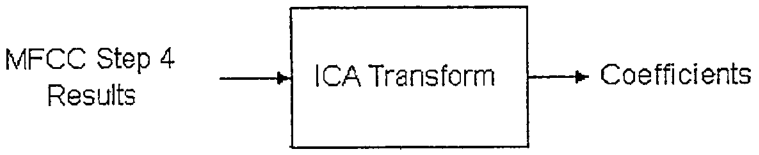
FIG. 7 is a flow chart showing a process used in the system of FIGS. 2 and 3 of computing ICA coefficients from MFCC results.

FIGS. 6 and 7 show the ICA process of FIG. 5(*b*). It includes a first step, shown in FIG. 6, of using the results of step 4 of the MFCC process to derive ICA basis functions (A) and weight functions (W), and a second step, shown in FIG. 7, of using the ICA basis functions and weight functions as an ICA transform to generate the ICA coefficients, namely IMFCC2.

As shown in FIG. 6, the results of the step 4 of the ICA-based MFCC algorithm FIG. 5(*b*) (i.e., the results of Mel scale filter bank) are partitioned to segment the Mel spectrum signals and overlap the edges of the adjacent segments of the signals so as to minimize the signal discontinuities at the edges. Then, the signals are de-correlated with a PCA (principle component analysis) algorithm, in which the PCA algorithm is applied to find the eigenvectors V of the covariance matrix of the observed signals (i.e. Mel spectrum signals) to eliminate the $2^{nd}$-order correlation among the observed signals. Then, the de-correlated signals are used for ICA learning, which uses a fast ICA algorithm to learn the orthogonal ICA demixing matrix dw to separate the de-correlated signals into statistically independent components. The result of the ICA learning is basis functions A and weight functions W, in which the basis function $A=V^{+}\times dw^{T}$, and the weight function $W=dW\times V$, where + denotes pseudo-inverse for a non-square matrix or inverse for square matrix, and T denotes matrix transpose operation.

Referring to FIG. 7, after the ICA basis functions A and weight functions W are computed, the results of step 4 of the MFCC process, namely, the Mel spectrum coefficients, are ICA transformed with the help of the ICA basis functions and weight functions, to obtain the ICA coefficients, i.e. the ICA-based MFCC features, IMCC2.

Figure 8:
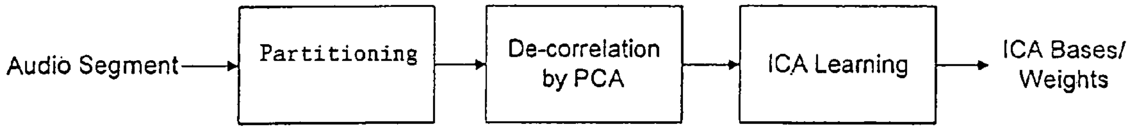
FIG. 8 is a flow chart showing a process used in the system of FIGS. 2 and 3 of computing Independent Coefficient Analysis (ICA) basis functions/weight functions from audio segments selected from an audio data input.
Figure 9:
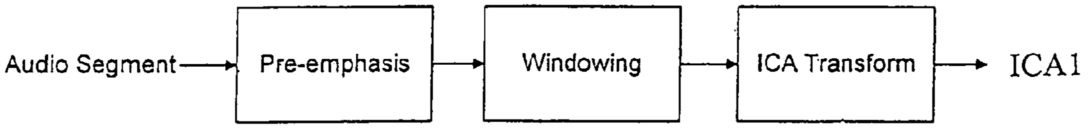
FIG. 9 is a flow chart showing a process used in the system of FIGS. 2 and 3 of computing Independent Coefficient Analysis (ICA) coefficients with the audio segments of FIG. 8.

Whereas in FIG. 4(*b*) and 5(*b*), the features IMFCC1 and IMFCC2 are obtained by a process involving a Fourier analysis and a mel spectrum treatment, FIGS. 8 and 9 illustrate a process of extracting the ICA features from the audio data in the time domain. The resultant signal is here called ICA1.

FIG. 8 shows a process of computing the ICA basis functions and weight functions by inputting an audio segment randomly selected from the audio data, and FIG. 9 shows a process of computing the ICA coefficients ICA1 from the same audio segment input. It can be seen that the procedures shown in FIGS. 8 and 9 are almost the same as FIGS. 6 and 7 respectively, except that for computing the ICA coefficients ICA1, the audio segment is subjected to pre-emphasis and windowing. The pre-emphasis preprocesses the audio segment to reduce noise and improve the SNR of the audio signal, and the windowing is used to frame and window the signal so as to divide the signal and eliminate the discontinuities of the divided signal. Note that this operation is not required in FIG. 7, since the results of step 4 of FIG. 5(*b*) have already be pre-emphasized and windowed in steps 1 and 2.

With the above two audio feature extraction methods, a vector of audio features (IMFCC1, IMFCC2, ICA1) can be obtained.

For the pattern recognition, a Hidden Markov Model (HMM) is introduced to the AAR system of the present invention. For each audio file, segments with equal length (which may for example be 5 seconds) are randomly selected from each of the target audio files and used to train the HMM models. By selecting enough segments from the audio data to train the HMM models, the audio data can be represented by these HMM models. During the recognition process, only one segment from target audio data file or from an existing digital audio data is required. With this segment, the HMM recognition algorithm can recognize its label by using a model database containing all of the HMM models.

FIG. 2 shows the flow chart of the audio data modeling process including audio feature extraction, audio data model training and model database generation. Unlike the conventional system which uses many audio features such as amplitude, peak, pitch, brightness, bandwidth, MFCC and their first derivatives, the embodiment only uses the improved MFCC features IMFCC1, IMFCC2 and the ICA features ICA1 which makes the feature extraction faster and more efficient than the prior art.

The process of the HMM modeling in FIG. 2 will now be described. In step 201, a fixed number (N) of audio segments with pre-defined length (m seconds which remains unchanged for the whole training process) are randomly selected from each target audio file (i.e. each of the W audio files which are to be recognized). For example, 90 audio segments with a length of 5 seconds may be selected from each target audio file. The target audio file is pre-recorded audio data or an existing digital audio data. Then, the audio segments go through the signal preprocessing for framing and windowing the audio segments in step 202. In step 3, a vector of audio features [IMFCC1, IMFCC 2 and ICA1] is obtained for each segment by the methods described above. Steps 201-203 are repeated for each target audio file. The respective vectors for each segment of each target audio file are used as the data input to the HMM.

The embodiment uses a respective HMM model for each of the W target audio files, and each of the HMM has a left-to-right structure. Although the present invention is not limited to models having a left-to-right structure, such models are preferred because their structure resembles that of the data (i.e. the linear time sequence represents the left-to-right HMM structure). As is conventional, the state of each HMM is denoted here as a set of model parameters $\lambda=\{A, B, \pi\}$. In step 204, the HMM model for each target audio file is initialized according to the training data. In this step, the HMM is told which target audio file the training data comes from ("classification"). For each target audio file, the model parameters $\lambda=\{A, B, \pi\}$ are set to initial values based on the training data using a known HMM initialization algorithm.

During a model training step 205, the W initialized HMM models are trained to optimize the model parameters by using the HMM training algorithm. During the training process, an iterative approach is applied to find the optimum model parameters for which the training data are best represented. During this procedure, the model parameters, $\lambda=\{A, B,\pi\}$, are adjusted in order to maximize the probability of observations, given the model: $P(O|\lambda)$, where 5 represents the observations. The optimization of the HMM parameters is thus an application of probability theory, i.e. expectation maximization techniques.

After finding the model parameters $\lambda=\{A, B, \pi\}$ of each model, a database 207 containing data $D=\{\lambda_1, \lambda_2, \ldots, \lambda_w\}$ is created containing all the models for the target audio files, as shown in step 206. For example, if the AAR is a song recognition system, a database containing a model for each selected song is set up, so that the song recognition system can recognize all the selected songs in this database. Each model is associated with a pre-determined audio label for further recognition.

After setting up the audio modeling database 207, the next task is to construct an audio recognition scheme. The audio recognition process can be seen in FIG. 3. The first task is to obtain observed data as shown in step 301. The observed data is obtained by cutting one segment with a length of m seconds from a microphone-recorded audio data or an existing digital audio data file. When the audio data is played in a general audio device such as a TV, CD player, Cassette Recorder, the microphone records one segment of this audio data with length of m seconds, which is the same as that in the training process. Note that the value of m may be adjustable, e.g. to be more than 5 seconds. Then, in step 302, the obtained segment is subjected to the signal preprocessing for framing and windowing as well as noise reduction, as described above. In step 303, for the preprocessed segment, an observation vector of audio features, O=[IMFCC1; IMFCC2; ICA1], is calculated using the audio feature extraction method introduced above. In step 304, once the observation vector O is obtained, the forward-backward algorithm is used to calculate the probabilities of the observation vector O given the models. Based on these probabilities, the audio recognition is implemented by finding a model $\lambda_k$ among the models stored in the database $D=\{\lambda_1, \lambda_2, \ldots, \lambda_w\}$ which has the maximum probability of observation given the model: $k=\max_{i=1, 2, \ldots, w}\{P(O|\lambda_i)\}$. The audio label corresponding to the model $\lambda_k$ is output as the recognition result in step 305.

The above description of the invention is intended to be illustrative and not limiting. Various changes or modifications in the embodiment described above may occur to those skilled in the art and these can be made without departing from the scope of the invention. For example, in the above embodiment of the present invention, the extracted audio features are a combination of IMFCC1, IMFCC 2 and ICA1. However, experiments show that the audio recognition can also achieve high accuracy when the audio feature(s) include only one feature selected from these three (e.g. an accuracy rate of 95% when there are 100 target files, each having an average length of 200 seconds; note that in other embodiments of the invention it is expected that the number of target files will be much higher than this). Furthermore, it would be possible (though not desirable) for any one of more of these three novel features to be used in combination with other audio features known from the prior art.

The invention claimed is:

1. A method of identifying, among a plurality of music audio files in digital format generated by machine, a first one of the music audio files, the method employing a segment of audio data which is derived from the first music audio file and comprising the steps of:

(a) inputting the segment of audio data generated by the machine into three different extraction processes, the three different extraction processes including (1) an IMFCC1 (first improved mel frequency cepstrum coefficients) extraction process, the IMFCC1 extraction process performing a conventional MFCC (mel frequency cepstrum coefficients) algorithm but not performing a logarithmic step of the conventional MFCC algorithm, wherein IMFCC1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) process, wherein IMFCC2 audio features are output, and (3) an ICA1 (improved independent component analysis) extraction process performing a conventional ICA (independent component analysis) process but subjecting the segment of audio data to pre-emphasis preprocessing and windowing preprocessing, wherein ICA1 features are output;

(b) creating an observation vector containing the IMFCC1 audio features, the IMFCC2 audio features and the ICA1 audio features; and (c) recognizing the machine generated first music audio file using the observation vector and a database trained using only observation vectors containing IMFCC1, IMFCC2 and ICA1 audio features for each respective target music audio file; wherein the audio features comprise features obtained by analyzing the audio data, or a transformed version of the audio data, to derive a transform based on its audio features, and applying the transform to the audio data, or the transformed version of the audio data respectively, to obtain amplitudes of the audio features.

2. A method according to claim 1 in which the transform is an independent component analysis (ICA) of the audio data or the transformed version of the audio data.

3. A method according to claim 1 in which the audio features include said ICA1 features, and the step of computing the ICA1 features comprises the steps of:

pre-emphasizing the audio data to improve the SNR of the data;

windowing the pre-emphasized data; and

ICA transforming the windowed data with ICA basis functions and weight functions to obtain the ICA1 features.

4. A method according to claim 1, in which the audio features include said IMFCC2 features, and the IMFCC2 features are obtained by further including the steps of:

preprocessing the audio data to pre-emphasize and window the audio data;

transforming the processed data from the time domain into the frequency domain; and ICA processing Mel spectrum data to obtain ICA coefficients as the IMFCC2 features.

5. A method of identifying, among a plurality of music audio files in digital format generated by machine, a first one of the music audio files, the method employing a segment of audio data which is derived from the first music audio file and comprising the steps of:

(a) inputting the segment of audio data generated by the machine into three different extraction processes, the three different extraction processes including (1) an IMFCC1 (first improved mel frequency cepstrum coefficients) extraction process, the IMFCC1 extraction process performing a conventional MFCC (mel frequency cepstrum coefficients) algorithm but not performing a logarithmic step of the conventional MFCC, wherein IMFCC1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) process, wherein IMFCC2 audio features are output, and (3) an ICA1 (improved independent component analysis) extraction process performing a conventional ICA (independent component analysis) process but subjecting the segment of audio data to re-emphasis preprocessing and windowing preprocessing, wherein ICA1 audio features output;

(b) creating an observation containing the IMFCC1 audio features, the IMFCC2 audio features and ICA1 audio features; and (c) recognizing the machine generated first music audio file using the observation vector and a database trained using only observation vectors containing IMFCC1, IMFCC2 and ICA1 audio features for each respective target music audio file.

6. A method according to claim 5, in which the IMFCC2 features are further obtained by:

preprocessing the audio data to pre-emphasize and window the audio data;

transforming the processed data from time domain into the frequency domain; and converting Mel spectrum data back to time domain data to obtain the IMFCC2 features.

7. A method according to claim 5, wherein step (b) is performed by determining, within a database containing HMM models for each respective target audio file, the HMM models for which probability of the observation vector being obtained given the target audio file is a maximal.

8. A method of identifying, among a plurality of music audio files in digital format generated by machine, a first one of the music audio files, the method employing a segment of audio data which is derived from the first music audio file and comprising the steps of:

(a) inputting the segment of audio data generated by the machine into three different extraction processes, the three different extraction processes including (1) an IMFCC1 (first improved mel frequency cepstrum coefficients) extraction process, the IMFCC1 extraction process performing a conventional MFCC (mel frequency cepstrum coefficients) algorithm but not performing a logarithmic step of the conventional MFCC algorithm, wherein IMFCC1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) process, wherein IMFCC2 audio features are output, and (3) an ICA1 (improved independent component analysis) extraction process performing a conventional ICA (independent component analysis) process but subjecting the segment of audio data to pre-emphasis preprocessing and windowing preprocessing, wherein ICA1 audio features are output;

(b) creating an observation vector containing the IMFCC1, IMFCC2 and ICA1 audio features;

(c) recognizing the machine generated first music audio file using the observation vector; wherein step (c) is performed by determining, within a database containing HMM models trained using only observation vectors containing IMFCC1, IMFCC2 and ICA1 audio features for each respective target music audio file, the HMM model for which probability of the observation vector being obtained given the target music audio file is maximal.

9. A method for generating a database of HMM models for use in a method according to claim 8, the method comprising the steps of:

extracting a plurality of segments from each of the target audio files;

generating training data which is the amplitudes of statistically significant audio features of the segments;

initializing HMM model parameters for the target audio file with the training data by an HMM initialization algorithm;

training the initialized model parameters to optimize the model parameters by an HMM training algorithm; and establishing an audio modeling database of the trained HMM model parameters.

10. An apparatus for identifying, among a plurality of music audio files in digital format generated by machine, a first one of the music audio files, based on a segment of audio data which is derived from the first music audio file, the apparatus comprising:

(a) input unit inputting the segment of audio data generated by the machine into three different extraction processes, the three different extraction processes including (1) an IMFCC1 (first improved mel frequency cepstrum coefficients) extraction process, the IMFCC1 extraction process performing a conventional MFCC (mel frequency cepstrum coefficients) algorithm but not performing a logarithmic step of the conventional MFCC algorithm, wherein IMFCC 1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) process, wherein IMFCC2 audio features are output, and (3) an ICA1 (improved independent component analysis) extraction process performing a conventional ICA (independent component analysis) process but subjecting the segment of audio data to pre-emphasis preprocessing and windowing preprocessing, wherein ICA1 audio features are output;

(b) creation unit creating an observation vector containing the IMFCC1, IMFCC2 and ICA1 audio features output by the three different extraction processes respectively; and (c) recognition unit recognizing the machine generated first music audio file using the observation vector and a database trained using only observation vectors containing IMFCC1, IMFCC2 and ICA1 audio features for each respective target music audio file;

wherein the audio features comprise features obtained by analyzing the audio data, or a transformed version of the audio data, to derive a transform based on its audio features, and applying the transform to the audio data, or the transformed version of the audio data respectively, to obtain amplitudes of the audio features.

11. An apparatus according to claim 10 in which the transform is an independent component analysis (ICA) of the audio data or the transformed version of the audio data.

12. An apparatus according to claim 10, wherein said recognition unit comprises:

a database containing HMM models for each respective target audio file, and a determination unit determining the HMM models in the database for which probability of the observation vector being obtained given the target audio file is a maximal.

13. An apparatus for identifying, among a plurality of music audio files in digital format generated by machine, a first one of the music audio files, based on a segment of audio data which is derived from the first music audio file, the apparatus comprising:

(a) input unit inputting the segment of audio data generated by the machine into three different extraction processes, the three different extraction processes including (1) an IMFCC1 (first improved mel frequency cepstrum coefficients) extraction process, the IMFCC1 extraction process performing a conventional MFCC (mel frequency cepstrum coefficients) algorithm but not performing a logarithmic step of the conventional MFCC algorithm, wherein IMFCC1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) wherein IMFCC2 audio features are output, and (3) an ICA1 (improved independent component analysis) extraction process performing a conventional ICA (independent component analysis) process but subjectin the segment of audio data to pre-emphasis preprocessing and windowing preprocessing wherein ICA1 audio features are output;

(b) creation unit creating an observation vector containing IMFCC1, IMFCC2 and ICA1 audio features output by the three different extraction processes respectively; and (c) recognition unit recognizing the machine generated first music audio file using the observation vector and a database trained using only observation vectors containing IMFCC1, IMFCC2 and ICA1 audio features for each respective target music audio file.

14. An apparatus according to claim 13, wherein said recognition unit comprises:

a database containing HMM models for each respective target audio file, and a determination unit determining the HMM models in the database for which probability of the observation vector being obtained given the target audio file is a maximal.

15. An apparatus for identifying, among a plurality of music audio files in digital format generated by machine, a first one of the music audio files, based on a segment of audio data which is derived from the first music audio file, the apparatus comprising:

(a) input unit inputting the segment of audio data generated by the machine into three different extraction processes, the different extraction processes including (1) an IMFCC1 (first improved mel frequency cepstrum coefficients) extraction process, the IMFCC1 extraction process performing a conventional MFCC mel frequency cepstrum coefficients) algorithm but not performing a logarithmic step of the conventional MFCC algorithm, wherein IMFCC1 audio features are output, (2) an IMFCC2 (second improved mel frequency cepstrum coefficients) extraction process, the IMFCC2 extraction process performing the conventional MFCC algorithm but not performing both the logarithmic step and a discrete cosine transform step of the conventional MFCC algorithm and instead performing an ICA (independent component analysis) process, wherein IMFCC2 audio features are output, and (3) an ICA1 (improved independent component analysis) extraction process performing a conventional ICA (independent component analysis) process but subjecting the segment of audio data to pre-emphasis preprocessing and windowing preprocessing, wherein ICA1 audio features are output;

(b) creation unit creating an observation vector containing the IMFCC1, IMFCC2 and ICA1 audio features output by the three different extraction processes respectively;

(c) a database containing HMM models trained using only observation vectors containing IMFCC1, IMFCC2 and ICA1 audio features for each respective target machine generated music audio file, and (d) determination unit determining the HMM model in the database for which probability of the observation vector being obtained given the target music audio file is maximal.

16. An apparatus according to claim 15, further comprising:

means for extracting as training data a plurality of segments from each of the target audio files;

means for initializing HMM model parameters for the target audio file with the training data by an HMM initialization algorithm;

means for training the initialized model parameters to optimize the model parameters by an HMM training algorithm; and means for establishing an audio modeling database of the trained HMM model parameters.

17. A method of identifying, among a plurality of audio files in digital format generated by machine, a first one of the audio files, the method employing a segment of audio data which is derived from the first audio file and comprising the steps of:

(a) inputting the segment of audio data generated by the machine into different extraction processes, at least one of the different extraction processes including an IMFCC (improved mel frequency cepstrum coefficients) extraction process, the IMFCC extraction process performing a conventional MFCC (mel frequency cepstrum coefficients) algorithm but not performing both a logarithmic step of the conventional MFCC algorithm, and a discrete cosine transform step of the conventional MFCC algorithm and instead performing an ICA (independent component analysis) process, wherein IMFCC audio features are output;

(b) creating an observation vector containing at least the IMFCC audio features extracted from the segment of audio data; and (c) recognizing the machine generated first audio file using the observation vector; wherein the audio features comprise features obtained by analyzing the audio data, or a transformed version of the audio data, to derive a transform based on its audio features, and applying the transform to the audio data, or the transformed version of the audio data respectively, to obtain amplitudes of the audio features.

18. An apparatus for identifying, among a plurality of audio files in digital format generated by machine, a first one of the audio files, based on a segment of audio data which is derived from the first audio file, the apparatus comprising:

(a) input unit inputting the segment of audio data generated by the machine into different extraction processes, at least one of different extraction processes including an IMFCC (improved mel frequency cepstrum coefficients) extraction process, the IMFCC extraction process performing a conventional MFCC (mel frequency cepstrum coefficients) algorithm but not performing both a logarithmic step of the conventional MFCC algorithm, and a discrete cosine transform step of the conventional MFCC algorithm and instead performing an ICA (independent component analysis) process, wherein IMFCC audio features are output;

(b) creation unit creating an observation vector containing at least the IMFCC audio features extracted from the segment of audio data; and (c) recognition unit recognizing the machine generated first audio file using the observation vector;

wherein the audio features comprise features obtained by analyzing the audio data, or a transformed version of the audio data, to derive a transform based on its audio features, and applying the transform to the audio data, or the transformed version of the audio data respectively, to obtain amplitudes of the audio features.

* * * * *